US012726767B2

(12) United States Patent
OConnor et al.

(10) Patent No.: US 12,726,767 B2
(45) Date of Patent: Sep. 1, 2026

(54) ACOUSTICAL TRANSDUCER COMPOSITE GLASS PANEL

(71) Applicant: GM GLOBAL TECHNOLOGY OPERATIONS LLC, Detroit, MI (US)

(72) Inventors: Joshua P. OConnor, Commerce, MI (US); Bo Yang, Rochester Hills, MI (US); Gabriel Strong, Clinton Township, MI (US); Steven J. Jennings, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 18/829,533

(22) Filed: Sep. 10, 2024

(65) Prior Publication Data

US 2026/0075365 A1 Mar. 12, 2026

(51) Int. Cl.
*H04R 7/04* (2006.01)
*B32B 7/12* (2006.01)
(Continued)

(52) U.S. Cl.
CPC ............... *H04R 7/045* (2013.01); *B32B 7/12* (2013.01); *B32B 17/10045* (2013.01);
(Continued)

(58) Field of Classification Search
CPC .. H04R 7/045; H04R 1/028; H04R 2307/023; H04R 2440/05; H04R 2499/13;
(Continued)

(56) References Cited

U.S. PATENT DOCUMENTS 5,598,380 A * 1/1997 Saurer ................... B60S 1/0822 318/483
2005/0002537 A1* 1/2005 Azima ................... H04R 7/045 381/333

(Continued)

FOREIGN PATENT DOCUMENTS

DE 102019207011 A1 11/2020
WO 2005016711 A1 2/2005

OTHER PUBLICATIONS

D2In: Wikipedia, Die freie Enzyklopädie. Bearbeitungsstand: Aug. 25, 2024. URL: https://de.wikipedia.org/w/index.php?title=Dynamisches_Mikrofon&oldid=248038408 [abgerufen am Feb. 15, 2025].

*Primary Examiner* — Oyesola C Ojo
(74) *Attorney, Agent, or Firm* — Quinn IP Law

(57) ABSTRACT

An acoustical transducer composite glass panel includes a primary glass pane, a secondary glass pane, and at least one excitable glass pane configured to acoustically respond to an excitation stimulus. The composite glass panel also includes an isolative material section configured to separate a corresponding excitable glass pane from the secondary glass pane. The secondary glass pane is arranged along the primary glass panel and equidistant therefrom. Each excitable glass pane is arranged along the primary glass panel and equidistant therefrom and adjacent to the secondary glass pane, and a first portion of each excitable glass pane is spaced apart from the primary glass pane. Additionally, the isolative material section is arranged along the primary glass panel and equidistant therefrom, between an edge of the secondary glass pane and an edge of a second portion of the corresponding excitable glass pane.

20 Claims, 5 Drawing Sheets

(51) Int. Cl.
*B32B 17/10* (2006.01)
*H04R 1/02* (2006.01)

(52) U.S. Cl.
CPC .......... *H04R 1/028* (2013.01); *B32B 2307/10* (2013.01); *B32B 2307/7376* (2023.05); *B32B 2605/00* (2013.01); *H04R 2307/023* (2013.01); *H04R 2440/05* (2013.01); *H04R 2499/13* (2013.01)

(58) Field of Classification Search
CPC . B32B 7/12; B32B 17/10045; B32B 2307/10; B32B 2307/7376; B32B 2605/00; B32B 17/00; B32B 17/10; B60J 1/002; B08B 7/028
See application file for complete search history.

(56) References Cited

U.S. PATENT DOCUMENTS

2008/0150327 A1* 6/2008 Boehm .................. H10F 19/80 296/216.01
2014/0022813 A1* 1/2014 Krijn .................. G02B 6/0053 362/606
2015/0086048 A1* 3/2015 Brown .................. H04R 7/045 381/152
2018/0250722 A1* 9/2018 Trevett .................. B08B 7/028
2020/0122434 A1* 4/2020 Reichardt .............. B32B 17/00
2023/0191754 A1* 6/2023 Boure .............. B32B 17/10788 428/139
2026/0075365 A1* 3/2026 OConnor ................ B60J 1/002

* cited by examiner

ACOUSTICAL TRANSDUCER COMPOSITE GLASS PANEL

The present disclosure is drawn to a composite glass panel with the functionality of an acoustical transducer.

A window is an opening in a wall, door, or roof of a structure that allows the exchange of light and may also allow the passage of sound and sometimes air. Modern windows openings are usually glazed or covered in a transparent or translucent material such as glass and may include a sash holding a pane of transparent material set in a frame. The sash permits the window to be opened to allow ventilation or closed to exclude inclement weather. A window may have a latch or similar mechanism to lock the subject window shut or to hold it open by various amounts.

Modern vehicles include windows using glass panels to separate the vehicle interior from the external environment. Such glass panels may be fixed relative to doors or vehicle body structure or be moveable to be opened and closed by a vehicle user. Vehicle glass may be tempered with a thermal or chemical treatment to facilitate its controlled fracture. Vehicle glass panels may also be laminated, i.e., have a multiple layer structure, to provide acoustical insulation, ultraviolet (UV) ray protection for the vehicle occupants and their cargo, as well as controlled fracture thereof.

SUMMARY

An acoustical transducer composite glass panel includes a primary glass pane, a secondary glass pane, and at least one excitable glass pane configured to acoustically respond to an excitation stimulus. The acoustical transducer composite glass panel also includes an isolative material section configured to separate a corresponding excitable glass pane from the secondary glass pane. In a cross-sectional view, the secondary glass pane is arranged along the primary glass panel and equidistant therefrom. Also in the cross-sectional view, each excitable glass pane is arranged along the primary glass panel and equidistant therefrom and adjacent to the secondary glass pane, and a first portion of each excitable glass pane is spaced apart from the primary glass pane. Additionally, in the cross-sectional view, the isolative material section is arranged along the primary glass panel and equidistant therefrom, between an edge of the secondary glass pane and an edge of a second portion of the corresponding excitable glass pane.

The acoustical transducer composite glass panel may also include, in the cross-sectional view, a structural adhesive layer arranged between the primary glass pane and the second portion of each excitable glass pane, the isolative material section, and the secondary glass pane.

In the cross-sectional view, the primary glass pane may have a flat or uniform outer surface and an inner surface in contact with the structural adhesive layer.

The acoustical transducer composite glass panel may also include an exciter mounted to the first portion of each excitable glass pane and configured to generate the excitation stimulus.

The composite glass panel may be one of a vehicle roof panel and a vehicle rear window panel.

In the cross-sectional view, the primary glass pane may define a void region above or over the first portion of each excitable glass pane.

In the cross-sectional view, the first portion of each excitable glass pane may extend outside or beyond the primary glass pane.

Alternatively, In the cross-sectional view, the primary glass pane may extend over and cover each void region and the first portion of each excitable glass pane.

In the cross-sectional view, the secondary glass pane, each excitable glass pane, and the isolative material section may together define a continuous flat (uniform) outer surface of the acoustical transducer composite glass panel.

In the cross-sectional view, the primary glass pane, the secondary glass pane, the excitable glass pane(s), and the isolative material section together may have a combined thickness of 5 mm.

A vehicle having the above-described acoustical transducer composite glass panel is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
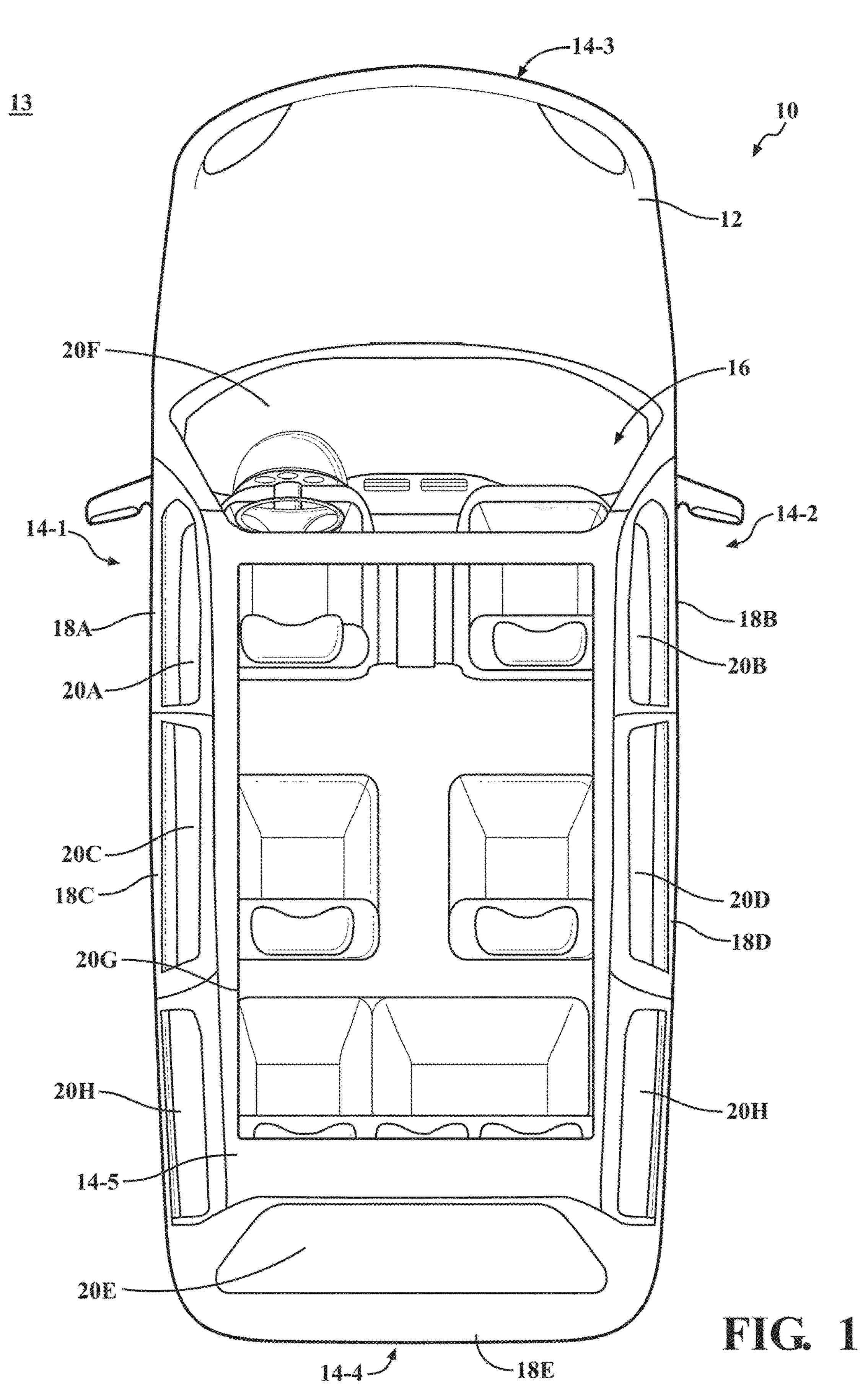
FIG. 1 is a schematic top view of a vehicle having a plurality of windows, according to the present disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made.

Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components throughout the several views, FIG. 1 schematically depicts a vehicle 10. The vehicle 10 is generally characterized by a vehicle body 12 surrounded by an external environment 13. The vehicle body 12 defines a vehicle interior or cabin 16 configured to accommodate a vehicle operator and passenger(s), for example in a generally seated position. Vehicle body 12 includes a left-side section 14-1, a right-side section 14-2, a front-end section 14-3, a rear-end section 14-4, and a roof section 14-5. Vehicle body 12 also includes a plurality of side doors, such as left-front door 18A, right-front door 18B, left-rear door 18C, and right-rear door 18D. Vehicle body 12 may be configured as a hatchback that also includes a tailgate 18E (at the rear-end section 14-4) for gaining access to the vehicle cabin 16. Alternatively, vehicle body 12 may be configured as a notchback (not shown) with an enclosed cargo hold or trunk at the rear-end section 14-4 in place of a liftgate.

Each of the doors 18A, 18B, 18C, 18D, 18E may be lockable from the inside or the outside of the vehicle and have a respective moveable or stationary window panel, 20A, 20B, 20C, 20D, 20E separating the vehicle interior from the external environment 13. In the notchback configuration of the vehicle body 12, window panel 20E may be a fixed rear window. Additionally, vehicle 10 further includes a windshield 20F and the roof section 14-5 may include a moveable or stationary window panel 20G. As shown, the vehicle may also have fixed side windows 20H. Each of the window panels 20A, 20B, 20C, 20D, 20E, 20F, 20G, 20H may be configured as an acoustical transducer composite glass panel, i.e., a glass panel to be used as a speaker, according to the following description. The acoustical transducer composite glass panel may also be employed in stationary structures (not shown), such as residential and commercial buildings. The subject acoustical transducer composite glass panel has a general laminated glass structure. The acoustical transducer composite glass panel is generally identified with numeral 30 in FIGS. 2-5.

Figure 2:
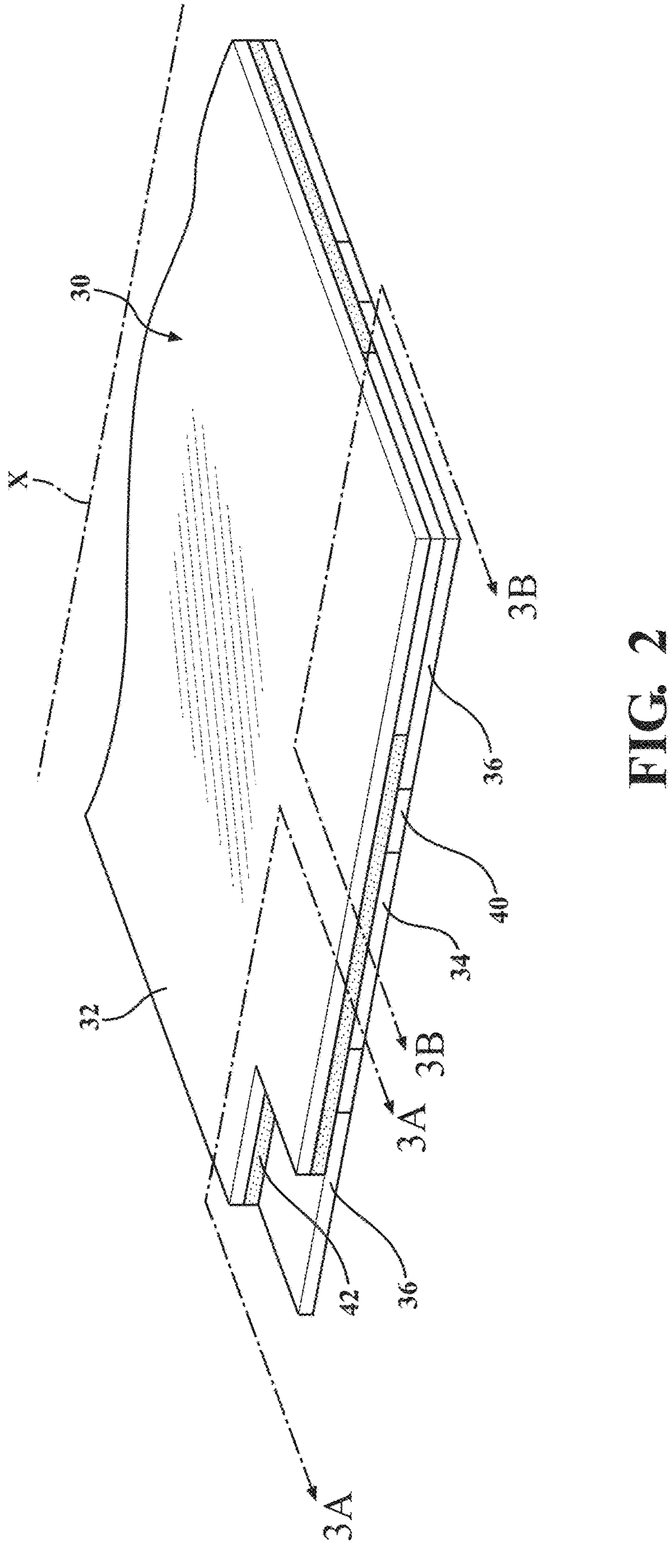
FIG. 2 is a schematic perspective partial view of an acoustical transducer composite glass panel configured to be installed in each of the windows shown in FIG. 1, illustrating separate configuration of the glass panel according to the present disclosure.
Figure 3A:
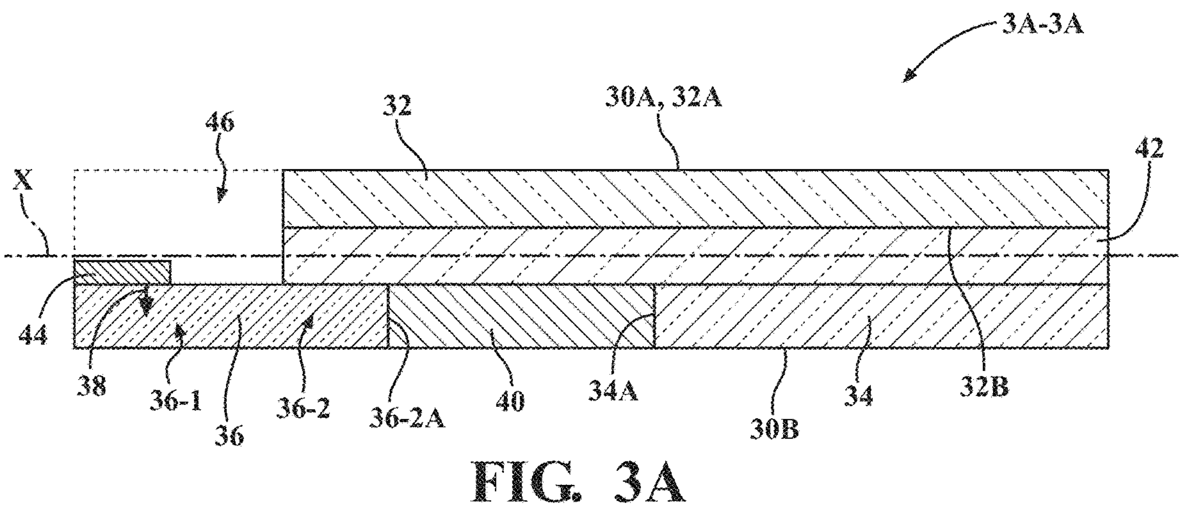
FIG. 3A is a schematic cross-sectional side view of a particular configuration of the acoustical transducer composite glass panel shown in FIG. 2, according to the present disclosure.
Figure 3B:
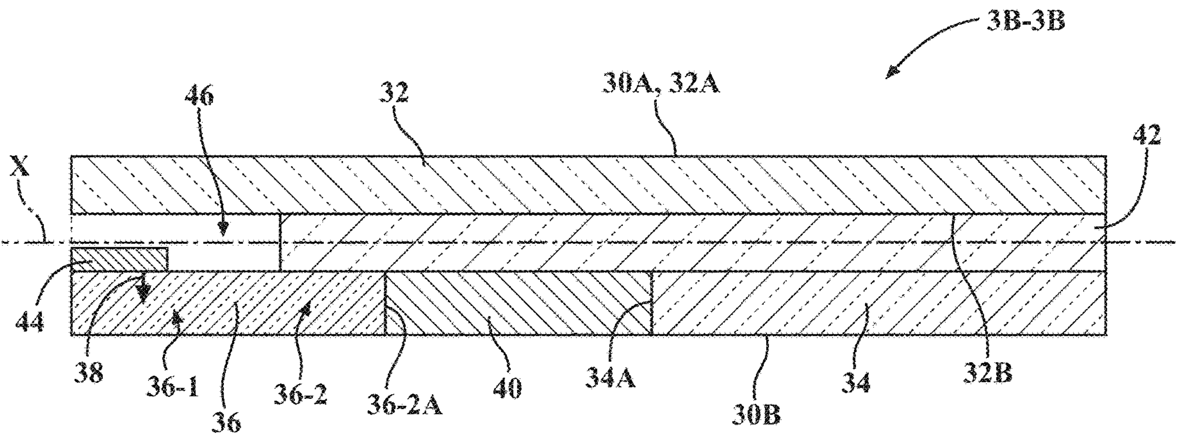
FIG. 3B is a schematic cross-sectional side view of another configuration of the acoustical transducer composite glass panel shown in FIG. 2, according to the present disclosure.
Figures 4A, 4B:
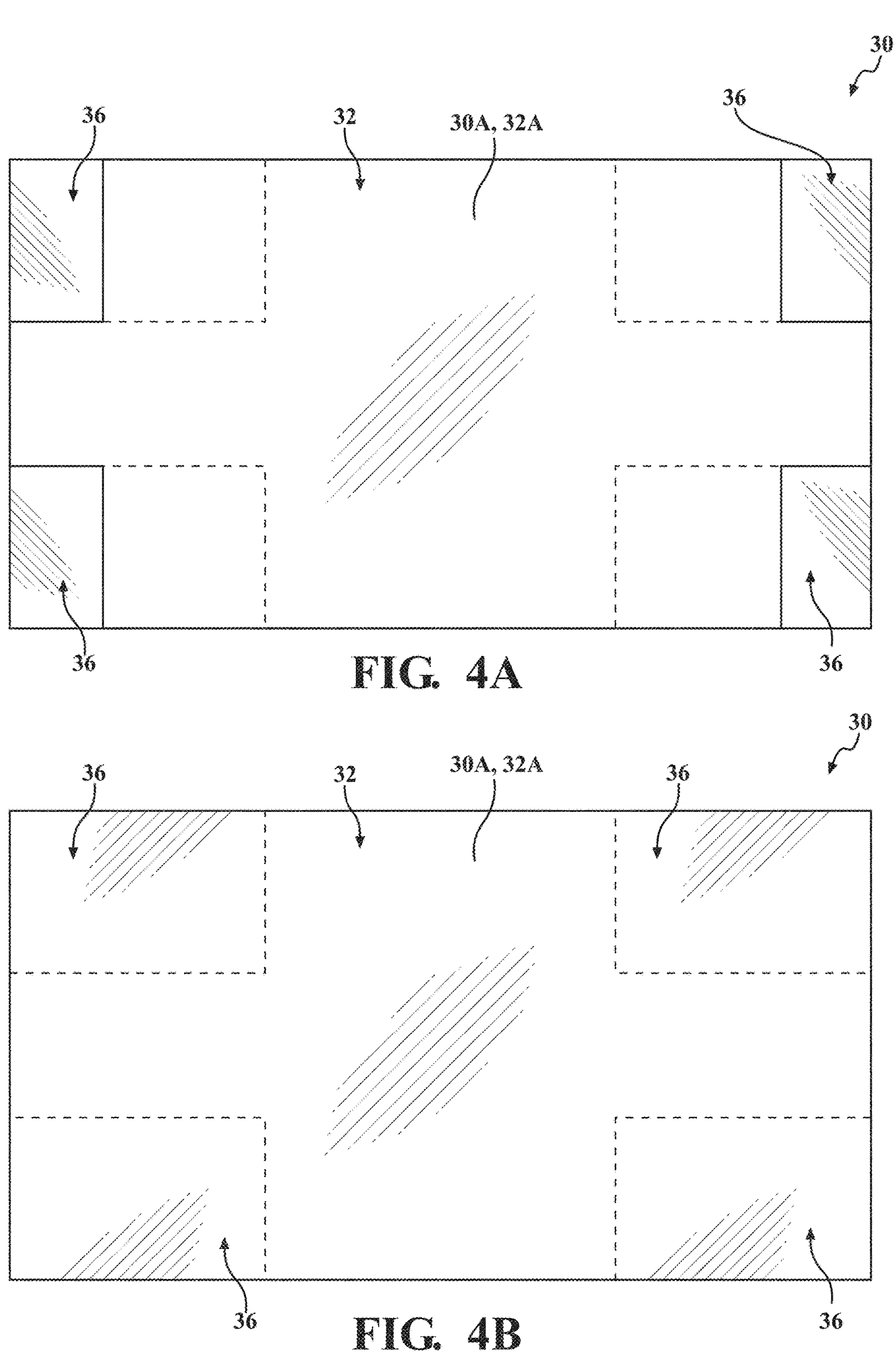
FIG. 4A is a schematic top view of the embodiment of the acoustical transducer composite glass panel shown in FIG. 3A, according to the present disclosure.
FIG. 4B is a schematic top view of the embodiment of the acoustical transducer composite glass panel shown in FIG. 3B, according to the present disclosure.

As shown in FIGS. 2, 3A, and 3B, the acoustical transducer composite glass panel 30 includes a primary glass pane 32 and a secondary glass pane 34. The acoustical transducer composite glass panel 30 also includes at least one excitable glass pane 36 configured to acoustically, i.e., vibrationally, respond to an excitation stimulus 38 (shown in FIGS. 3A and 3B). The acoustical transducer composite glass panel 30 additionally includes an isolative material section 40 configured to separate a corresponding excitable glass pane 36 from the secondary glass pane 34 and block transmission of vibration therebetween. FIGS. 3A and 3B depict respective cross-sectional views 3A-3A and 3B-3B of separate configurations of the acoustical transducer composite glass panel 30 arranged relative to an axis X, as identified in FIG. 2.

As shown in cross-sectional views 3A-3A and 3B-3B of the acoustical transducer composite glass panel 30 depicted in corresponding FIGS. 3A and 3B, the secondary glass pane 34 is arranged parallel to the primary glass pane 32. In a curved the acoustical transducer composite glass panel 30, the secondary glass pane 34 is arranged along the primary glass panel 32 and substantially equidistant therefrom. Each excitable glass pane 36 is arranged parallel to (along and substantially equidistant from) the primary glass pane 32 and adjacent to the secondary glass pane 34. As also shown in FIGS. 3A and 3B, first portion 36-1 of each excitable glass pane 36 is spaced apart from the primary glass pane 32. Additionally, the isolative material section 40 is arranged parallel to (along and substantially equidistant from) the primary glass pane 32, between adjacent edges of the secondary glass pane 34 and the excitable glass pane 36. Specifically, the isolative material section 40 is arranged between edge 34A of the secondary glass pane 34 and neighboring edge 36-2A of a second portion 36-2 of the corresponding excitable glass pane 36.

With continued reference to FIGS. 3A and 3B, in the cross-sectional views 3A-3A and 3B-3B, the acoustical transducer composite glass panel 30 may also include a structural adhesive layer 42. The structural adhesive layer 42 is arranged between the primary glass pane 32 and the second portion 36-2 of each excitable glass pane 36, the isolative material section 40, and the secondary glass pane 34. The structural adhesive layer 42 bonds the secondary glass pane 34, the excitable glass pane 36, and the isolative material section 40 to the primary glass pane 32. But for the structural adhesive layer 42, the secondary glass pane 34, the excitable glass pane 36, and the isolative material section 40 may be considered to reside alongside the primary glass pane 32. The structural adhesive layer 42 may be formed from a polymer material configured to absorb shock and vibration and prevent the glass panes from breaking into large sharp pieces. The acoustical transducer composite glass panel 30 may additionally include an exciter 44 mounted to the first portion 36-1 of each excitable glass pane 36 and configured to generate the excitation stimulus 38.

As shown in FIGS. 3A and 3B, in the in the cross-sectional views 3A-3A and 3B-3B, the primary glass pane 32 defines a void region 46 above the first portion 36-1 of each excitable glass pane 36. As shown in FIG. 3A, the first portion 36-1 of each excitable glass pane 36 may extend outside or beyond the primary glass pane 32. The embodiment of FIG. 3A is also shown in the top view in FIG. 4A. As shown in FIG. 3B, the primary glass pane 32 may extend over and cover each void region 46 and the first portion 36-1 of each excitable glass pane 36. The embodiment of FIG. 3 is also shown in the top view in FIG. 4B. As shown in each of FIGS. 3B and 4B, the primary glass pane 32 may have a flat or uniform outer surface 32A defining a first outer surface 30A of the acoustical transducer composite glass panel 30. As may be seen in each of FIGS. 3A and 3B, the primary glass pane 32 may also have an inner surface 32B in contact with the structural adhesive layer 42.

In the cross-sectional view 3A-3A and 3B-3B shown in respective FIGS. 3A and 3B, the secondary glass pane 34, each excitable glass pane 36, and the isolative material section 40 may together define a substantially continuous, flat (uniform) second outer surface 30B of the acoustical transducer composite glass panel 30. Furthermore, in each of the cross-sectional views of FIGS. 3A and 3B, the primary glass pane 32, the secondary glass pane 34, the excitable glass pane(s) 36, and the isolative material section 40 together may have a combined thickness of approximately 5 mm. In the context of vehicle 10, the acoustical transducer composite glass panel 30 employed as roof window panel 20G may be mounted to an upper frame portion of the roof section 14-5. Each exciter 44 may be electrically connected to a vehicle infotainment system (not shown) arranged in the vehicle cabin 16 to generate the excitation stimulus 38 for audio reproduction via the acoustical transducer composite glass panel 30.

Figure 5:
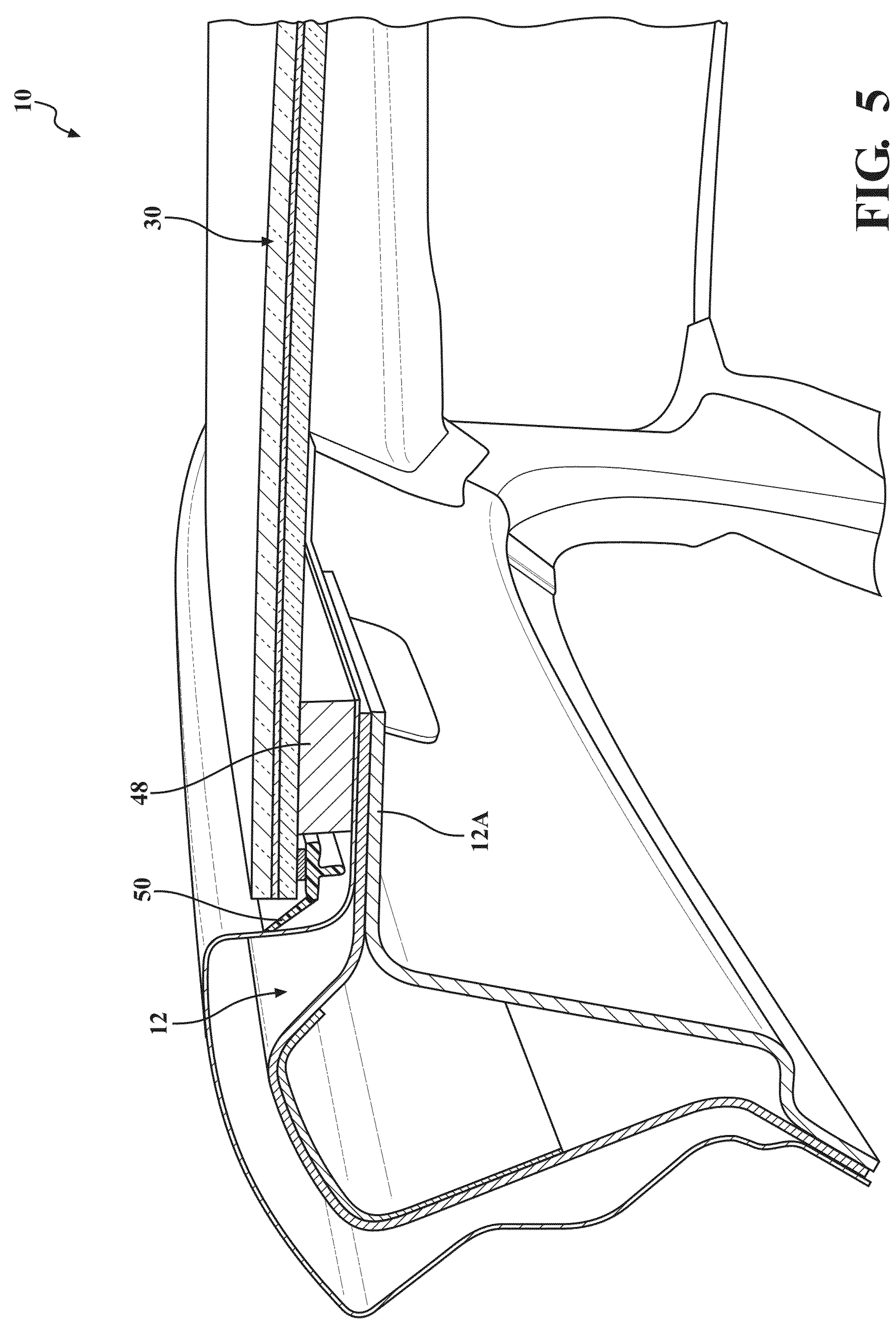
FIG. 5 is a schematic perspective partial view of the vehicle structure shown in FIG. 1, illustrating a sectional view of the acoustical transducer composite glass panel shown in FIGS. 2-4B employed as a roof mounted window, according to the present disclosure.

The acoustical transducer composite glass panel 30 may be bonded to a structural frame portion of the vehicle body 12, as shown in FIG. 5, or to a building structure (not shown). Specifically, a urethane adhesive 48 bonding the roof glass embodiment of the acoustical transducer composite glass panel 30 to the vehicle body 12 may be applied around the perimeter of the glass panel 30. Accordingly, the urethane adhesive 48 may be applied to the secondary glass pane 34 as well as to the excitable glass pane(s) 36. A flange or extended edge 12A of the body frame may be used as a mounting surface for the acoustical transducer composite glass panel 30. Such an embodiment of the acoustical transducer composite glass panel 30 is configured to be fixed to the vehicle body. A moveable roof mounted acoustical transducer composite glass panel 30 or a section thereof is also envisioned.

A protective molding 50 may be arranged between the flange 12A and the acoustical transducer composite glass panel 30 to block debris from collecting around and damaging the urethane adhesive 48 (shown in FIG. 5). Molding 50 may be mounted to the excitable glass pane(s) 36 and to the secondary glass pane 34 or it may contact the excitable glass pane(s) 36 and the secondary glass pane 34 and be mounted directly to the vehicle body 12. Additionally, molding 50 may be used to cover the embodiment of the void region 46 shown in FIGS. 3A and 4A, where the primary glass pane 32 stops short of extending over the void region, by being mounted to the vehicle body 12 over glass panel 30 (not shown).

Overall, the acoustical transducer composite glass panel 30 enables window glass to be used for sound reproduction. The acoustical transducer composite glass panel is a laminated structure including excitable glass pane(s) mounted to the primary pane alongside but separated from the secondary pane. The acoustical transducer composite glass panel defines a void region configured to facilitate acoustic response of the excitable glass pane bordering the void region. Such a void region may be formed above a portion of the excitable glass pane and may be defined between the excitable glass pane and the primary glass pane. Such glass panels may be used in vehicles as well as in building structures.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An acoustical transducer composite glass panel comprising:

a primary glass pane;

a secondary glass pane;

at least one excitable glass pane configured to acoustically respond to an excitation stimulus; and an isolative material section configured to separate a corresponding excitable glass pane from the secondary glass pane;

wherein, in a cross-sectional view:

the secondary glass pane is arranged along the primary glass panel and equidistant therefrom;

each excitable glass pane is arranged along the primary glass panel and equidistant therefrom and adjacent to the secondary glass pane, and a first portion of each excitable glass pane is spaced apart from the primary glass pane; and the isolative material section is arranged along the primary glass panel and equidistant therefrom, between a material thickness edge of the secondary glass pane and a material thickness edge of a second portion of the corresponding excitable glass pane.

2. The acoustical transducer composite glass panel of claim 1, further comprising, in the cross-sectional view, a structural adhesive layer arranged between the primary glass pane and the second portion of each excitable glass pane, the isolative material section, and the secondary glass pane.

3. The acoustical transducer composite glass panel of claim 2, wherein, in the cross-sectional view, the primary glass pane has a flat outer surface and an inner surface in contact with the structural adhesive layer.

4. The acoustical transducer composite glass panel of claim 1, further comprising an exciter mounted to the first portion of each excitable glass pane and configured to generate the excitation stimulus.

5. The acoustical transducer composite glass panel of claim 1, wherein the composite glass panel is one of a vehicle roof panel and a vehicle rear window panel.

6. The acoustical transducer composite glass panel of claim 1, wherein, in the cross-sectional view, the primary glass pane defines a void region above the first portion of each excitable glass pane.

7. The acoustical transducer composite glass panel of claim 6, wherein, in the cross-sectional view, the first portion of each excitable glass pane extends outside the primary glass pane.

8. The acoustical transducer composite glass panel of claim 6, wherein, in the cross-sectional view, the primary glass pane extends over and covers each void region and the first portion of each excitable glass pane.

9. The acoustical transducer composite glass panel of claim 1, wherein, in the cross-sectional view, the secondary glass pane, each excitable glass pane, and the isolative material section together define a continuous flat outer surface of the acoustical transducer composite glass panel.

10. The acoustical transducer composite glass panel of claim 9, wherein, in the cross-sectional view, the primary glass pane, the secondary glass pane, the excitable glass pane(s), and the isolative material section together have a combined thickness of 5 mm.

11. A vehicle comprising:

a vehicle body; and an acoustical transducer composite glass panel mounted to the vehicle body and including:

a primary glass pane;

a secondary glass pane;

at least one excitable glass pane configured to acoustically respond to an excitation stimulus; and an isolative material section configured to separate a corresponding excitable glass pane from the secondary glass pane;

wherein, in a cross-sectional view:

the secondary glass pane is arranged along the primary glass panel and equidistant therefrom;

each excitable glass pane is arranged along the primary glass panel and equidistant therefrom and adjacent to the secondary glass pane, and a first portion of each excitable glass pane is spaced apart from the primary glass pane; and the isolative material section is arranged along the primary glass panel and equidistant therefrom, between a material thickness edge of the secondary glass pane and a material thickness edge of a second portion of the corresponding excitable glass pane.

12. The vehicle of claim 11, wherein, in the cross-sectional view, the acoustical transducer composite glass panel additionally includes a structural adhesive layer arranged between the primary glass pane and the second portion of each excitable glass pane, the isolative material section, and the secondary glass pane.

13. The vehicle of claim 12, wherein, in the cross-sectional view, the primary glass pane has a flat outer surface and an inner surface in contact with the structural adhesive layer.

14. The vehicle of claim 11, wherein the acoustical transducer composite glass panel additionally includes an exciter mounted to the first portion of each excitable glass pane and configured to generate the excitation stimulus.

15. The vehicle of claim 11, wherein the composite glass panel is one of a vehicle roof panel and a vehicle rear window panel.

16. The vehicle of claim 11, wherein, in the cross-sectional view, the primary glass pane defines a void region above the first portion of each excitable glass pane.

17. The vehicle of claim 16, wherein, in the cross-sectional view, the first portion of each excitable glass pane extends outside the primary glass pane.

18. The vehicle of claim 15, wherein, in the cross-sectional view, the primary glass pane extends over and covers each void region and the first portion of each excitable glass pane.

19. The vehicle of claim 11, wherein, in the cross-sectional view, the secondary glass pane, each excitable glass pane, and the isolative material section together define a continuous flat outer surface of the acoustical transducer composite glass panel.

20. An acoustical transducer composite glass panel comprising:

a primary glass pane;

a secondary glass pane;

at least one excitable glass pane configured to acoustically respond to an excitation stimulus;

an isolative material section configured to separate a corresponding excitable glass pane from the secondary glass pane; and a structural adhesive layer;

wherein, in a cross-sectional view:

the secondary glass pane is arranged along the primary glass panel and equidistant therefrom;

each excitable glass pane is arranged along the primary glass panel and equidistant therefrom and adjacent to the secondary glass pane, and a first portion of each excitable glass pane is spaced apart from the primary glass pane; and the isolative material section is arranged along the primary glass panel and equidistant therefrom, between a material thickness edge of the secondary glass pane and a material thickness edge of a second portion of the corresponding excitable glass pane;

the structural adhesive layer is arranged between the primary glass pane and the second portion of each excitable glass pane, the isolative material section, and the secondary glass pane; and an exciter is mounted to the first portion of each excitable glass pane and configured to generate the excitation stimulus.

* * * * *